(12) United States Patent
Bishop et al.

(10) Patent No.: US 10,037,089 B2
(45) Date of Patent: Jul. 31, 2018

(54) ELECTROMAGNETIC WRITING APPARATUS FOR ELECTRO-OPTIC DISPLAYS

(71) Applicant: E Ink Corporation, Billerica, MA (US)

(72) Inventors: Seth J. Bishop, Framingham, MA (US); Sunil Krishna Sainis, Melrose, MA (US); George G. Harris, Woburn, MA (US); William Vetterling, Lexington, MA (US)

(73) Assignee: E Ink Corporation, Billerica, MA (US)

( * ) Notice: Subject to any disclaimer, the term of this patent is extended or adjusted under 35 U.S.C. 154(b) by 6 days.

(21) Appl. No.: 15/045,326

(22) Filed: Feb. 17, 2016

(65) Prior Publication Data

US 2016/0239113 A1 Aug. 18, 2016

Related U.S. Application Data

(60) Provisional application No. 62/117,349, filed on Feb. 17, 2015.

(51) Int. Cl.
*G06F 3/0354* (2013.01)
*G02F 1/167* (2006.01)
*G06F 3/038* (2013.01)
*G09G 3/34* (2006.01)

(52) U.S. Cl.
CPC .......... *G06F 3/03545* (2013.01); *G02F 1/167* (2013.01); *G06F 3/0383* (2013.01); *G09G 3/344* (2013.01)

(58) Field of Classification Search
None
See application file for complete search history.

(56) References Cited

U.S. PATENT DOCUMENTS

| | | | |
|---|---|---|---|
| 2,996,575 A | 8/1961 | Sims, Jr. | |
| 3,320,523 A | 5/1967 | Trimble | |
| 3,947,879 A | 3/1976 | Stauffer | |
| 4,418,346 A | 11/1983 | Batchelder | |
| 5,760,761 A | 6/1998 | Sheridon | |
| 5,777,782 A | 7/1998 | Sheridon | |
| 5,808,783 A | 9/1998 | Crowley | |
| 5,872,552 A | 2/1999 | Gordon, II | |
| 6,054,071 A | 4/2000 | Mikkelsen, Jr. | |
| 6,055,091 A | 4/2000 | Sheridon | |

(Continued)

FOREIGN PATENT DOCUMENTS

| JP | 2014531675 | 11/2014 |
|---|---|---|
| WO | 2007032898 | 3/2007 |
| WO | 2013049286 | 4/2013 |

OTHER PUBLICATIONS

Wood, D., "An Electrochromic Renaissance?" Information Display, 18(3), 24 (Mar. 2002) Mar. 1, 2002.

(Continued)

*Primary Examiner* — Joseph Haley
(74) *Attorney, Agent, or Firm* — Brian D. Bean

(57) ABSTRACT

Particle-based electro-optic displays are described that are both electrically and magnetically controllable. Global and local addressing may be provided. The global addressing may be providing by one or more electrodes of the display, and may be electrically activated. The local addressing may be provided by a writing implement, especially one capable of producing rotating electric fields.

20 Claims, 13 Drawing Sheets

(56) References Cited

U.S. PATENT DOCUMENTS

| | | | |
|---|---|---|---|
| 6,097,531 | A | 8/2000 | Sheridon |
| 6,128,124 | A | 10/2000 | Silverman |
| 6,130,774 | A | 10/2000 | Albert |
| 6,137,467 | A | 10/2000 | Sheridon |
| 6,144,361 | A | 11/2000 | Gordon, II |
| 6,147,791 | A | 11/2000 | Sheridon |
| 6,172,798 | B1 | 1/2001 | Albert |
| 6,184,856 | B1 | 2/2001 | Gordon, II |
| 6,225,971 | B1 | 5/2001 | Gordon, II |
| 6,241,921 | B1 | 6/2001 | Jacobson |
| 6,271,823 | B1 | 8/2001 | Gordon, II |
| 6,301,038 | B1 | 10/2001 | Fitzmaurice |
| 6,672,921 | B1 | 1/2004 | Liang |
| 6,704,133 | B2 | 3/2004 | Gates |
| 6,738,050 | B2 | 5/2004 | Comiskey |
| 6,788,449 | B2 | 9/2004 | Liang |
| 6,866,760 | B2 | 3/2005 | Paolini, Jr. |
| 6,870,657 | B1 | 3/2005 | Fitzmaurice |
| 6,922,276 | B2 | 7/2005 | Zhang et al. |
| 6,950,220 | B2 | 9/2005 | Abramson et al. |
| 6,982,178 | B2 | 1/2006 | LeCain et al. |
| 7,002,728 | B2 | 2/2006 | Pullen et al. |
| 7,012,600 | B2 | 3/2006 | Zehner |
| 7,075,502 | B1 | 7/2006 | Drzaic |
| 7,116,318 | B2 | 10/2006 | Amundson et al. |
| 7,170,670 | B2 | 1/2007 | Webber |
| 7,197,174 | B1 | 3/2007 | Koizumi |
| 7,236,291 | B2 | 6/2007 | Kaga et al. |
| 7,283,127 | B2 * | 10/2007 | Taylor ............... G06F 3/0346 178/18.01 |
| 7,312,784 | B2 | 12/2007 | Baucom et al. |
| 7,321,459 | B2 | 1/2008 | Masuda et al. |
| 7,339,715 | B2 | 3/2008 | Webber et al. |
| 7,411,719 | B2 | 8/2008 | Paolini, Jr. et al. |
| 7,420,549 | B2 | 9/2008 | Jacobson |
| 7,453,445 | B2 | 11/2008 | Amundson |
| 7,535,624 | B2 | 5/2009 | Amundson et al. |
| 7,679,814 | B2 | 3/2010 | Paolini, Jr. et al. |
| 7,791,789 | B2 | 9/2010 | Albert |
| 7,839,564 | B2 | 11/2010 | Whitesides et al. |
| 8,009,348 | B2 | 8/2011 | Zehner |
| 8,319,759 | B2 | 11/2012 | Jacobson |
| 2003/0067427 | A1 | 4/2003 | Comiskey et al. |
| 2006/0077171 | A1 * | 4/2006 | May ............... G09G 3/344 345/107 |
| 2009/0040594 | A1 | 2/2009 | Albert et al. |
| 2014/0333987 | A1 * | 11/2014 | Keam ............... G02F 1/167 359/296 |
| 2014/0362131 | A1 | 12/2014 | Paolini, Jr. |
| 2015/0309598 | A1 * | 10/2015 | Zeliff ............... G06F 3/03545 345/179 |
| 2016/0139694 | A1 * | 5/2016 | Go ............... G06F 3/16 345/179 |

OTHER PUBLICATIONS

O'Regan, B. et al., "A Low Cost, High-efficiency Solar Cell Based on Dye-sensitized colloidal TiO2 Films", Nature, vol. 353, Oct. 24, 1991, 737-740 Oct. 24, 1991.

Bach, U., et al., "Nanomaterials-Based Electrochromics for Paper-Quality Displays", Adv. Mater, 14(11), 845 (2002) Jun. 5, 2002.

Hayes, R.A., et al., "Video-Speed Electronic Paper Based on Electrowetting", Nature, vol. 425, Sep. 25, pp. 383-385 (2003) Sep. 25, 2003.

Kitamura, T., et al., "Electrical toner movement for electronic paper-like display", Asia Display/IDW '01, p. 1517, Paper HCS1-1 (2001) Jan. 1, 2001.

Yamaguchi, Y., et al., "Toner display using insulative particles charged triboelectrically", Asia Display/IDW '01, p. 1729, Paper AMD4-4 (2001) Jan. 1, 2001.

PCT/US2016/018152; International Search Report and Written Opinion; Korean Intellectual Property Office, dated Jun. 1, 2016.

\* cited by examiner

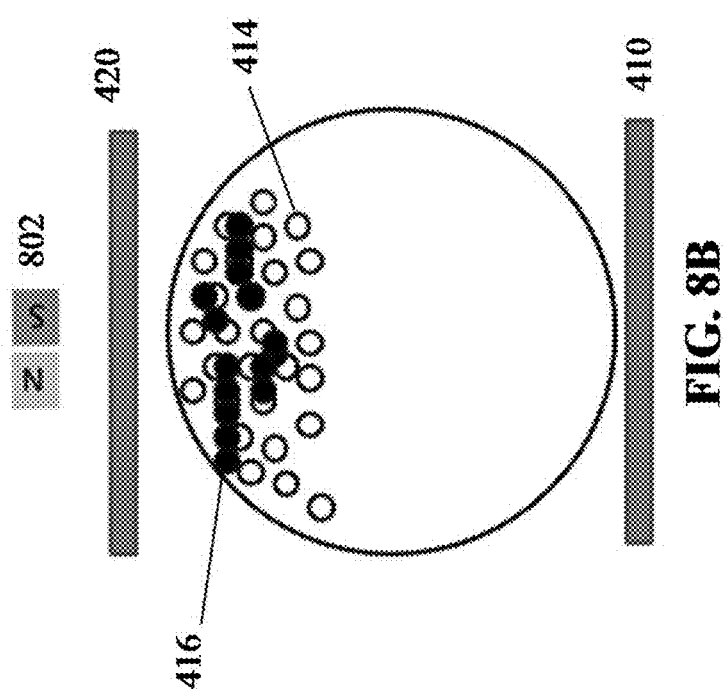

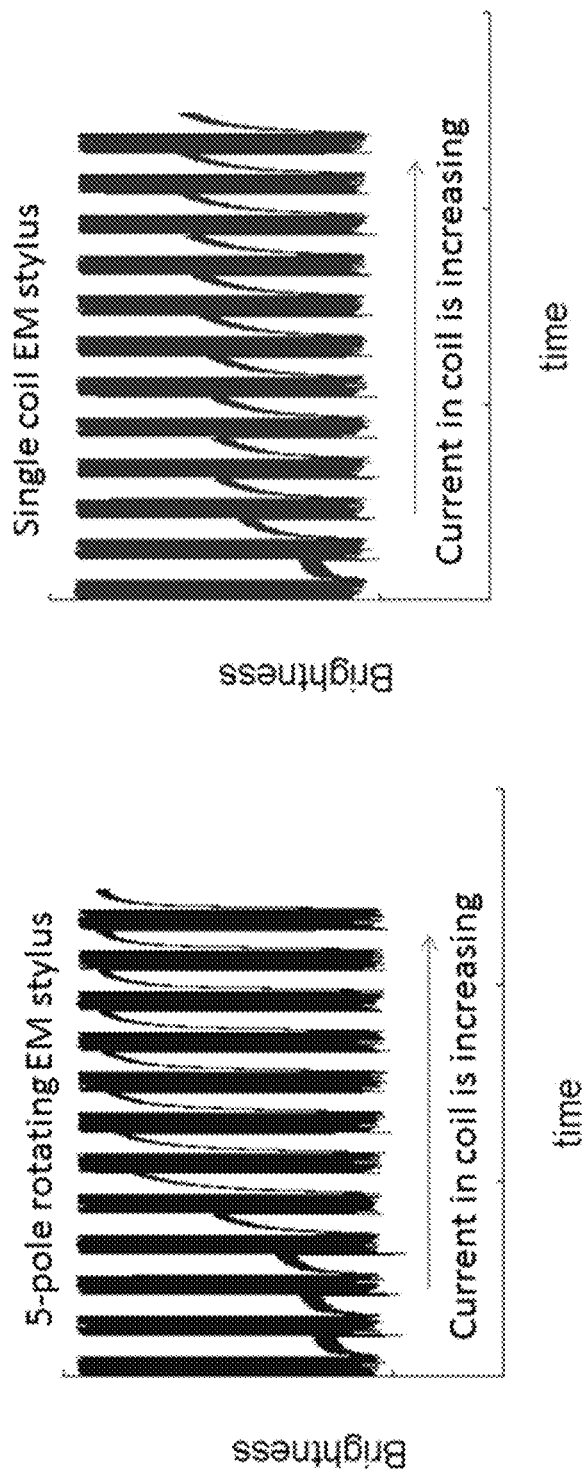

ELECTROMAGNETIC WRITING APPARATUS FOR ELECTRO-OPTIC DISPLAYS

REFERENCE TO RELATED APPLICATIONS

This application claims benefit of U.S. Provisional Application Ser. No. 62/117,349 filed on Feb. 17, 2015. The entire contents of this and all other U.S. patents and published and copending applications mentioned below are herein incorporated by reference.

BACKGROUND

The technology described herein relates to writeable and erasable electro-optic display that is magnetically-responsive, and related apparatus and methods.

Some electro-optic displays can be addressed with a stylus. For such electro-optic displays, the electro-optic display itself is able to detect the position of the stylus. As a user passes the stylus over a surface of the electro-optic display, the electro-optic display activates pixels corresponding to those over which the stylus passed, based on the position of the stylus detected by the electro-optic display.

SUMMARY

Aspects of the present application provide an electro-optic display that is both globally and locally addressable. The electro-optic display may be a particle-based, such as an electrophoretic display. The electro-optic display may include electrodes configured to apply an electric field across an electro-optic layer to perform global addressing. A writing implement may be configured to produce a time varying magnetic field, which may allow for local addressing of the electro-optic display when one or more particle types of the electro-optic display is magnetically responsive. In some embodiments, the electro-optic display is a large area display, for example having a diagonal dimensional greater than 40 inches, greater than 50 inches, greater than 70 inches, or having other suitable sizes.

Aspects of the present application relate to a writing implement for local addressing of an electro-optic display. The writing implement may be configured to produce a rotating magnetic field, which in at least some embodiments may have a gradient associated therewith. The rotating magnetic field may be applied to a particle-based electro-optic display, locally changing an optical state of the display.

According to an aspect of the present application, an apparatus is provided comprising an elongate tubular member having a first end and second end and being sized to be hand-held. The apparatus further comprises an electromagnet configured to generate, from the first end of the elongate tubular member, a rotating magnetic field. The apparatus may be used in conjunction with a particle-based display to provide local addressing functionality. The electro-optic display may include particles which are electrically and magnetically responsive.

BRIEF DESCRIPTION OF DRAWINGS

Various aspects and embodiments of the application will be described with reference to the following figures. It should be appreciated that the figures are not necessarily drawn to scale. Items appearing in multiple figures are indicated by the same reference number in all the figures in which they appear.

FIGS. 8A and 8B illustrate examples of creating a gray state of an electro-optic display using a combination of electric and magnetic addressing.

FIG. 9A is a graphical illustration of an electro-optic display in response to being addressed with a rotating magnetic field.

FIG. 9B is a graphical illustration of an electro-optic display in response to being addressed with an oscillating magnetic field.

DETAILED DESCRIPTION

Figure 1:
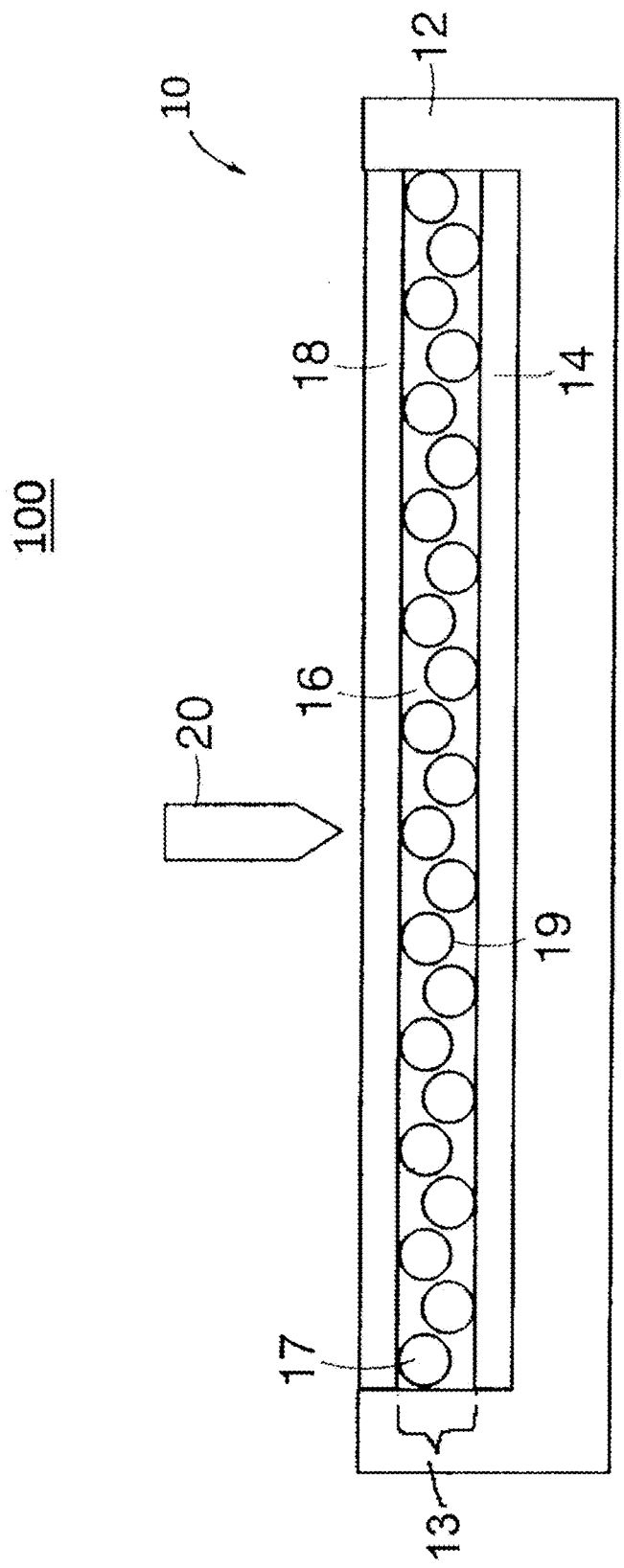
FIG. 1 illustrates an electro-optic display and writing implement according to a non-limiting embodiment of the present application.

Aspects of the present application relate to particle-based electro-optic displays which are electrically and magnetically addressable, and in at least some embodiments configured to provide both global and local addressing capabilities. The global addressing state may be electrically controllable. The local addressing capability may be provided by a writing implement creating a rotating and/or oscillating or static (DC) magnetic field.

The term "electro-optic", as applied to a material or a display, is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence or, in the case of displays intended for machine reading, pseudo-color in the sense of a change in reflectance of electromagnetic wavelengths outside the visible range.

The term "gray state" is used herein in its conventional meaning in the imaging art to refer to a state intermediate two extreme optical states of a pixel, and does not necessarily imply a black-white transition between these two extreme states. For example, several of the E Ink patents and published applications referred to below describe electrophoretic displays in which the extreme states are white and deep blue, so that an intermediate "gray state" would actually be pale blue. Indeed, as already mentioned, the change in optical state may not be a color change at all. The terms "black" and "white" may be used hereinafter to refer to the two extreme optical states of a display, and should be understood as normally including extreme optical states which are not strictly black and white, for example the aforementioned white and dark blue states. The term "monochrome" may be used hereinafter to denote a drive scheme which only drives pixels to their two extreme optical states with no intervening gray states.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

The term "impulse" is used herein in its conventional meaning of the integral of voltage with respect to time. However, some bistable electro-optic media act as charge transducers, and with such media an alternative definition of impulse, namely the integral of current over time (which is equal to the total charge applied) may be used. The appropriate definition of impulse should be used, depending on whether the medium acts as a voltage-time impulse transducer or a charge impulse transducer.

Several types of electro-optic displays are known. One type of electro-optic display is a rotating bichromal member type as described, for example, in U.S. Pat. Nos. 5,808,783; 5,777,782; 5,760,761; 6,054,071 6,055,091; 6,097,531; 6,128,124; 6,137,467; and 6,147,791 (although this type of display is often referred to as a "rotating bichromal ball" display, the term "rotating bichromal member" is preferred as more accurate since in some of the patents mentioned above the rotating members are not spherical). Such a display uses a large number of small bodies (typically spherical or cylindrical) which have two or more sections with differing optical characteristics, and an internal dipole. These bodies are suspended within liquid-filled vacuoles within a matrix, the vacuoles being filled with liquid so that the bodies are free to rotate. The appearance of the display is changed by applying an electric field thereto, thus rotating the bodies to various positions and varying which of the sections of the bodies is seen through a viewing surface. This type of electro-optic medium is typically bistable.

Another type of electro-optic display uses an electrochromic medium, for example an electrochromic medium in the form of a nanochromic film comprising an electrode formed at least in part from a semi-conducting metal oxide and a plurality of dye molecules capable of reversible color change attached to the electrode; see, for example O'Regan, B., et al., Nature 1991, 353, 737; and Wood, D., Information Display, 18(3), 24 (March 2002). See also Bach, U., et al., Adv. Mater., 2002, 14(11), 845. Nanochromic films of this type are also described, for example, in U.S. Pat. Nos. 6,301,038; 6,870,657; and 6,950,220. This type of medium is also typically bistable.

Another type of electro-optic display is an electro-wetting display developed by Philips and described in Hayes, R. A., et al., "Video-Speed Electronic Paper Based on Electrowetting", Nature, 425, 383-385 (2003). It is shown in U.S. Pat. No. 7,420,549 that such electro-wetting displays can be made bistable.

One type of electro-optic display, which has been the subject of intense research and development for a number of years, is the particle-based electrophoretic display, in which a plurality of charged particles move through a fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

As noted above, electrophoretic media require the presence of a fluid. In most prior art electrophoretic media, this fluid is a liquid, but electrophoretic media can be produced using gaseous fluids; see, for example, Kitamura, T., et al., "Electrical toner movement for electronic paper-like display", IDW Japan, 2001, Paper HCS1-1, and Yamaguchi, Y., et al., "Toner display using insulative particles charged triboelectrically", IDW Japan, 2001, Paper AMD4-4). See also U.S. Pat. Nos. 7,321,459 and 7,236,291. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT) and E Ink Corporation describe various technologies used in encapsulated electrophoretic and other electro-optic media. Such encapsulated media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. The technologies described in the these patents and applications include:

(a) Electrophoretic particles, fluids and fluid additives; see for example U.S. Pat. Nos. 7,002,728; and 7,679,814;
(b) Capsules, binders and encapsulation processes; see for example U.S. Pat. Nos. 6,922,276; and 7,411,719;
(c) Films and sub-assemblies containing electro-optic materials; see for example U.S. Pat. Nos. 6,982,178; and 7,839,564;

(d) Backplanes, adhesive layers and other auxiliary layers and methods used in displays; see for example U.S. Pat. Nos. 7,116,318; and 7,535,624;

(e) Color formation and color adjustment; see for example U.S. Pat. No. 7,075,502; and U.S. Patent Application Publication No. 2007/0109219;

(f) Methods for driving displays; see for example U.S. Pat. Nos. 7,012,600; and 7,453,445;

(g) Applications of displays; see for example U.S. Pat. No. 7,312,784; and U.S. Patent Application Publication No. 2006/0279527; and (h) Non-electrophoretic displays, as described in U.S. Pat. Nos. 6,241,921; 6,950,220; and 7,420,549; and U.S. Patent Application Publication No. 2009/0046082.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned U.S. Pat. No. 6,866,760. Accordingly, for purposes of the present application, such polymer-dispersed electrophoretic media are regarded as sub-species of encapsulated electrophoretic media.

A related type of electrophoretic display is a so-called "microcell electrophoretic display". In a microcell electrophoretic display, the charged particles and the fluid are not encapsulated within microcapsules but instead are retained within a plurality of cavities formed within a carrier medium, typically a polymeric film. See, for example, U.S. Pat. Nos. 6,672,921 and 6,788,449, both assigned to Sipix Imaging, Inc.

Although electrophoretic media are often opaque (since, for example, in many electrophoretic media, the particles substantially block transmission of visible light through the display) and operate in a reflective mode, many electrophoretic displays can be made to operate in a so-called "shutter mode" in which one display state is substantially opaque and one is light-transmissive. See, for example, U.S. Pat. Nos. 5,872,552; 6,130,774; 6,144,361; 6,172,798; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode. Electro-optic media operating in shutter mode may be useful in multi-layer structures for full color displays; in such structures, at least one layer adjacent the viewing surface of the display operates in shutter mode to expose or conceal a second layer more distant from the viewing surface. Other types of electro-optic media may also be used in the displays of the present invention.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (See U.S. Pat. No. 7,339,715); and other similar techniques.) Thus, the resulting display can be flexible. Further, because the display medium can be printed, using a variety of methods, the display itself can be made inexpensively.

Other types of electro-optic materials may also be used in the present invention.

An electrophoretic display normally comprises a layer of electrophoretic material and at least two other layers disposed on opposed sides of the electrophoretic material, one of these two layers being an electrode layer. In most such displays both the layers are electrode layers, and one or both of the electrode layers are patterned to define the pixels of the display. For example, one electrode layer may be patterned into elongate row electrodes and the other into elongate column electrodes running at right angles to the row electrodes, the pixels being defined by the intersections of the row and column electrodes. Alternatively, and more commonly, one electrode layer has the form of a single continuous electrode and the other electrode layer is patterned into a matrix of pixel electrodes, each of which defines one pixel of the display. In another type of electrophoretic display, which is intended for use with a stylus, print head or similar movable electrode separate from the display, only one of the layers adjacent the electrophoretic layer comprises an electrode, the layer on the opposed side of the electrophoretic layer typically being a protective layer intended to prevent the movable electrode damaging the electrophoretic layer.

In yet another embodiment, such as described in U.S. Pat. No. 6,704,133, electrophoretic displays may be constructed with two continuous electrodes and an electrophoretic layer and a photoconductive layer between the electrodes. Because the photoconductive material changes resistivity with the absorption of photons, incident light can be used to alter the state of the electrophoretic medium. Such a device is illustrated in FIG. 1. As described in U.S. Pat. No. 6,704,133, the device of FIG. 1 works best when driven by an emissive source, such as an LCD display, located on the opposed side of the display from the viewing surface. In some embodiments, the devices of U.S. Pat. No. 6,704,133 incorporated special barrier layers between the front electrode and the photoconductive material to reduce "dark currents" caused by incident light from the front of the display that leaks past the reflective electro-optic media.

The aforementioned U.S. Pat. No. 6,982,178 describes a method of assembling a solid electro-optic display (including an encapsulated electrophoretic display) which is well adapted for mass production. Essentially, this patent describes a so-called "front plane laminate" ("FPL") which comprises, in order, a light-transmissive electrically-conductive layer; a layer of a solid electro-optic medium in electrical contact with the electrically-conductive layer; an adhesive layer; and a release sheet. Typically, the light-transmissive electrically-conductive layer will be carried on a light-transmissive substrate, which is preferably flexible, in the sense that the substrate can be manually wrapped around a drum (say) 10 inches (254 mm) in diameter without permanent deformation. The term "light-transmissive" is used in this patent and herein to mean that the layer thus designated transmits sufficient light to enable an observer, looking through that layer, to observe the change in display states of the electro-optic medium, which will normally be viewed through the electrically-conductive layer and adjacent substrate (if present); in cases where the electro-optic medium displays a change in reflectivity at non-visible wavelengths, the term "light-transmissive" should of course be interpreted to refer to transmission of the relevant non-visible wavelengths. The substrate will typically be a polymeric film, and will normally have a thickness in the range of about 1 to about 25 mil (25 to 634 µm), preferably about 2 to about 10 mil (51 to 254 µm). The electrically-conductive layer is conveniently a thin metal or metal oxide layer of, for example, aluminum or ITO, or may be a conductive polymer. Poly(ethylene terephthalate) (PET) films coated with aluminum or ITO are available commercially, for example as "aluminized Mylar" ("Mylar" is a Registered Trade Mark) from E.I. du Pont de Nemours & Company, Wilmington Del., and such commercial materials may be used with good results in the front plane laminate.

Many types of electro-optic media are essentially monochrome, in the sense that any given medium has two extreme optical states and a range of gray levels lying between the two extreme optical states. However, there is today an increasing demand for full color displays, even for small, portable displays; for example, most displays on cellular telephones are today full color. To provide a full color display using monochrome media, it is either necessary to place a color filter array where the display can be viewed through the color filter array, or to place areas of different electro-optic media capable of displaying different colors adjacent one another.

The position of the color filter array (CFA) relative to the electro-optic medium in the optical stack can vary widely, but must take into account the type of electro-optic medium used and, in some cases, the properties of other layers of the optical stack. Color displays using CFA's can be broadly divided into two classes, namely front CFA displays (in which the CFA lies between the electro-optic medium and the viewing surface through which an observer views the display) and rear CFA displays (in which the CFA lies on the opposed side of the electro-optic medium from the viewing surface). If the electro-optic medium used is transmissive (i.e., light, typically from a backlight, passes through the electro-optic medium, which acts as a light valve controlling the amount of light which passes through each pixel, and then emerges from the viewing surface), the CFA can occupy any position in the optical stack, since regardless of the position of the CFA, light will pass through both the CFA and the electro-optic medium. Thus, both front and rear CFAs can be used with transmissive electro-optic media, although the former are probably more common.

In some instances, an electro-optic display is constructed with the CFA beneath the electro-optic medium. In a rear CFA electro-optic display, the CFA may be disposed between the electro-optic layer and the rear electrodes, or may be disposed on the opposed side of the rear electrodes from the electro-optic layer, but the former location is generally preferred because it reduces the distance between the electro-optic layer and the CFA (thus reducing parallax between the two layers and possible color distortions caused by light leaving the display at a substantial angle to the normal), and because it simplifies display construction; since production of color requires reflection of light from either the CFA or a layer disposed behind the CFA, it is convenient to use a light-transmissive CFA and rely upon reflective rear electrodes to effect the necessary light reflection, rather than having to provide light-transmissive rear electrodes to enable light to reach a CFA disposed behind the rear electrodes, and then either make the CFA itself reflective or provide a separate reflector behind the CFA. U.S. Patent Publication 2014/0362131 describes a rear CFA electro-optic display in which the electro-optic medium is capable of two opaque states and a light-transmissive state. The color saturation of the resulting display may be improved by incorporating fluorescent or phosphorescent materials into the rear color filter array.

Aspects of the present application relate to particle-based electro-optic displays which are electrically and magnetically addressable, and in at least some embodiments configured to provide both global and local addressing capabilities. The global addressing capability may be used to create a solid color state, for example white or black, and therefore be considered an "erase" state. The global addressing state may be electrically controllable. For example, the display may include electrodes on opposing sides of a particle-based ink layer of the display, and the electrodes may be operated to create a suitable electric field to set the ink to a uniform color state. The local addressing capability may be provided by a writing implement creating a rotating and/or oscillating or static (DC) magnetic field. The term "writing implement" as used herein includes a stylus.

The particle-based electro-optic display may include one or more pigment types. In a single-pigment display, the pigment is both electrically and magnetically controllable. In a multi-pigment display, at least one of the pigment types may be both electrically and magnetically controllable. An example of a multi-pigment display is a display including white pigment particles and black pigment particles. The black pigment particles may be both electrically and magnetically controllable, as an example. Commercially-available magnetic particles, such as Bayferrox 8600, 8610; Northern Pigments 604, 608; Magnox 104, TMB-100; Columbian Mapico Black; Pfizer CX6368, and CB5600 and the like, may be used alone or in combination with other known pigments to create pigments that are both electrically and magnetically controllable.

Another aspect of the present application relates to local addressing of a particle-based electro-optic display in multiple colors using a writing implement. The writing implement may be of the type described above, but may additionally include a detector, also referred to herein as a sensor. The display may include at least two colors of color filters. A user of the writing implement may select a desired color in which to write, corresponding to one of the colors of the color filters. The detector of the writing implement may detect when the writing implement is in proximity to a portion of the display having a color filter of the selected color. The writing implement may be activated at that time, and otherwise inactivated. In this manner, the display may be written in a desired color, or more than one desired color.

Another aspect of the present application provides a magnetic print head for local addressing of an electro-optic display. The magnetic print head may have a construction and operation similar to that of the writing implements described above.

Another aspect of the present application combines a writing implement with an active matrix electro-optic display. The display may sense on which portion(s) the writing implement has been used to write. The active matrix may then address those portions of the display to drive those portions to a desired display state. In this manner, the active matrix may be used to enhance the writing of the writing implement. The active matrix may be any suitable active matrix. A thin-film transistor (TFT) backplane may be used in some embodiments.

The aspects and embodiments described above, as well as additional aspects and embodiments, are described further below. These aspects and/or embodiments may be used individually, all together, or in any combination of two or more, as the application is not limited in this respect.

FIG. 1 shows a system 100, according to some embodiments, including an electro-optic display and a writing implement. Namely, the system 100 may include a display 10 and a mobile writing implement 20. As shown, the display 10 may be a particle-based display and the writing implement 20 may be configured to generate an oscillating or a rotating pole or static (DC) magnetic field, as will be described further below.

In some embodiments, display 10 may include a casing 12, a rear electrode 14, an electro-optic layer 13, and a front electrode 18. The front electrode 18 may represent the viewing side of the display 10, as well as the writing side.

An electro-optic layer 13 may include two phases: a discontinuous phase 17 and a continuous phase 16. The discontinuous phase 17 may have a plurality of microcapsules with one or more types of pigment particles suspended in a fluid (not shown in FIG. 1) that, as shown, may be encased by a microcapsule wall 19. The continuous phase 16 may be referred to as a binder and surrounds the continuous phase. The pigment particles may be controlled (displaced) with an electric field, thus making the display 10 an electrophoretic display. As described further below, the microcapsules contain at least one type of pigment particle that is responsive both to electric fields and magnetic fields.

In some embodiments, the electro-optic layer 13 may be a suspended particle display medium. The suspended particle display medium includes particles that aggregate or clump under the application of an AC electric field. The particles also aggregate or clump into needle or column shapes when a magnetic field is applied. Application of a DC electric field to the display causes the particles to migrate towards one of the electrodes. This puts the display into an opaque state.

In some embodiments, the casing 12 may be made from a plastic container capable of holding the electro-optic layer 13, the rear electrode 14, the front electrode 18, and/or any necessary electronics. Alternatively, the casing 12 may be made of any other material. The casing 12 may be of any size, ranging from small, for example for toy applications, to large, for example for applications in presentation displays.

In some embodiments, the display 10 includes additional components omitted from FIG. 1 for ease of illustration. For example, the display 10 may include a protective layer over the front electrode 18. In some embodiments, the display 10 has an intervening dielectric layer. The dielectric layer can be placed between the front electrode 18 and the display medium 13, be incorporated into the front electrode 18, or be incorporated into the binder material. The dielectric layer can store electric charge long enough to address the display media, without bleeding the charge. The dielectric layer may allow applied voltage to pass through the layer and reach the display medium. In this manner, the writing speed of the mobile writing implement can be increased, since the writing implement need not be positioned above the display medium for a duration necessary to address the display medium. In some embodiments, the dielectric layer is fabricated from a cross-linked polymer layer. In some embodiments, the dielectric layer is fabricated from a film made of, for example, polyethylene phthalate, polyethylene naphthalate, polypropylene, polyethylene, polyvinylchloride, polysulfone, polyphenylene oxide, ionomer, polycarbonate, nylon or fluororesin layered with a bond or adhesive or such.

In some embodiments, mobile writing implement 20 may be mechanically coupled to display 10. For example, mobile writing implement 20 may be coupled to display 10 by one or more wires configured to carry electrical signals between the writing implement 20 and the display 10. In some embodiments, display 10 may provide the power source for mobile writing implement 20. In some embodiments, mobile writing implement 20 may be wireless (at least in the sense that writing implement 20 may not be mechanically coupled to display 10 by any wires). In some embodiments, mobile writing implement 20 may include its own power source.

Figure 2A:
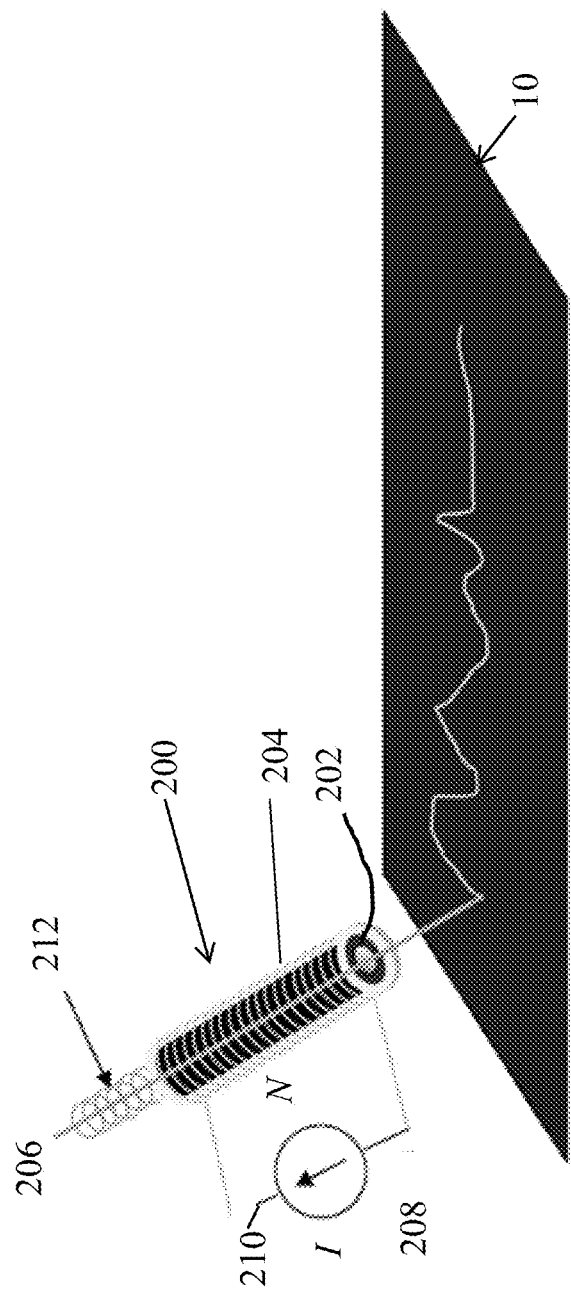
FIG. 2A illustrates a writing implement configured to produce a magnetic field, according to a non-limiting embodiment of the present application.

The writing implement 20 may be configured to generate a magnetic field. For example, the writing implement 20 may include one or more electromagnets or permanent magnets configured to generate an oscillating or rotating magnetic field. The magnetic field may be used to locally address a magnetically-responsive pigment particle of the display medium 13. FIG. 2A illustrates a non-limiting example of such a writing implement.

FIG. 2A illustrates a non-limiting example of a writing implement according to an embodiment of the present application. The writing implement 200 represents one manner in which writing implement 20 may be implemented. For context, FIG. 2A also illustrates a simplified representation of the display 10.

The writing implement 200 includes a tubular ferrite core 202 around which is wrapped a coil 204. Any suitable number N of windings may be provided. A rod 206 may be inserted through the tubular ferrite core 202. The rod 206 may be made of metal. A current source 208 may be provided, with the coil 204 being connected across the current source 208. A direct current (DC) may be applied to create a static magnetic field, or an alternating current (AC) may be applied to generate an oscillating magnetic field. The frequency and amplitude of the current may be selected or adjusted to provide a desired response from the electro-optic display.

Optionally, a switch 210 may be provided, allowing control over provision of the current from the current source 208 to the coil 204. Furthermore, a spring 212 may optionally be provided. The spring 212 may be coupled to the rod 206 so that when the spring is compressed (by a user pressing the writing implement against the viewing surface of the electro-optic display) the electromagnet will move closer to the writing surface of the electro-optic display. In this manner, the addressing of the electro-optic display may be altered, for example in terms of line width.

Figure 2B:
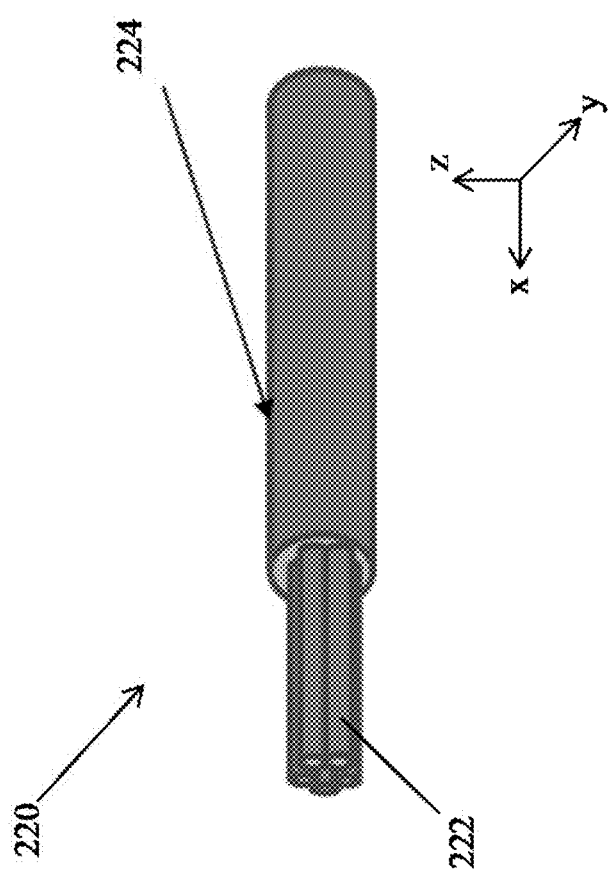
FIG. 2B illustrates a writing implement configured to produce a rotating magnetic field, according to a non-limiting embodiment of the present application.

FIG. 2B illustrates an example of a writing implement configured to provide a rotating magnetic field. The writing implement 220 represents an alternative to the writing implement 200 for implementing the writing implement 20 of FIG. 1.

The writing implement 220 is a combination of five writing implements 200, which in combination may establish a pentagonal geometry (e.g., a contour in the shape of a pentagon). That is, the writing implement 220 includes five electromagnets 222. Each of the electromagnets 222 may be substantially the same as the electromagnet of FIG. 2A, and therefore may include, for example, a ferrite core and coil. However, the electromagnets 222 need not all include each component of the writing implement 200. For example, in some embodiments the electromagnets 222 do not each include a switch, and may not each include a distinct current source. Rather, certain components, such as switches and current sources, may be shared.

The writing implement 220 further includes an outer shell 224. The outer shell 224 may facilitate holding the writing implement 220, may maintain the electromagnets 222 in a desired position relative to each other, or may perform any other desired function.

Figure 2C:
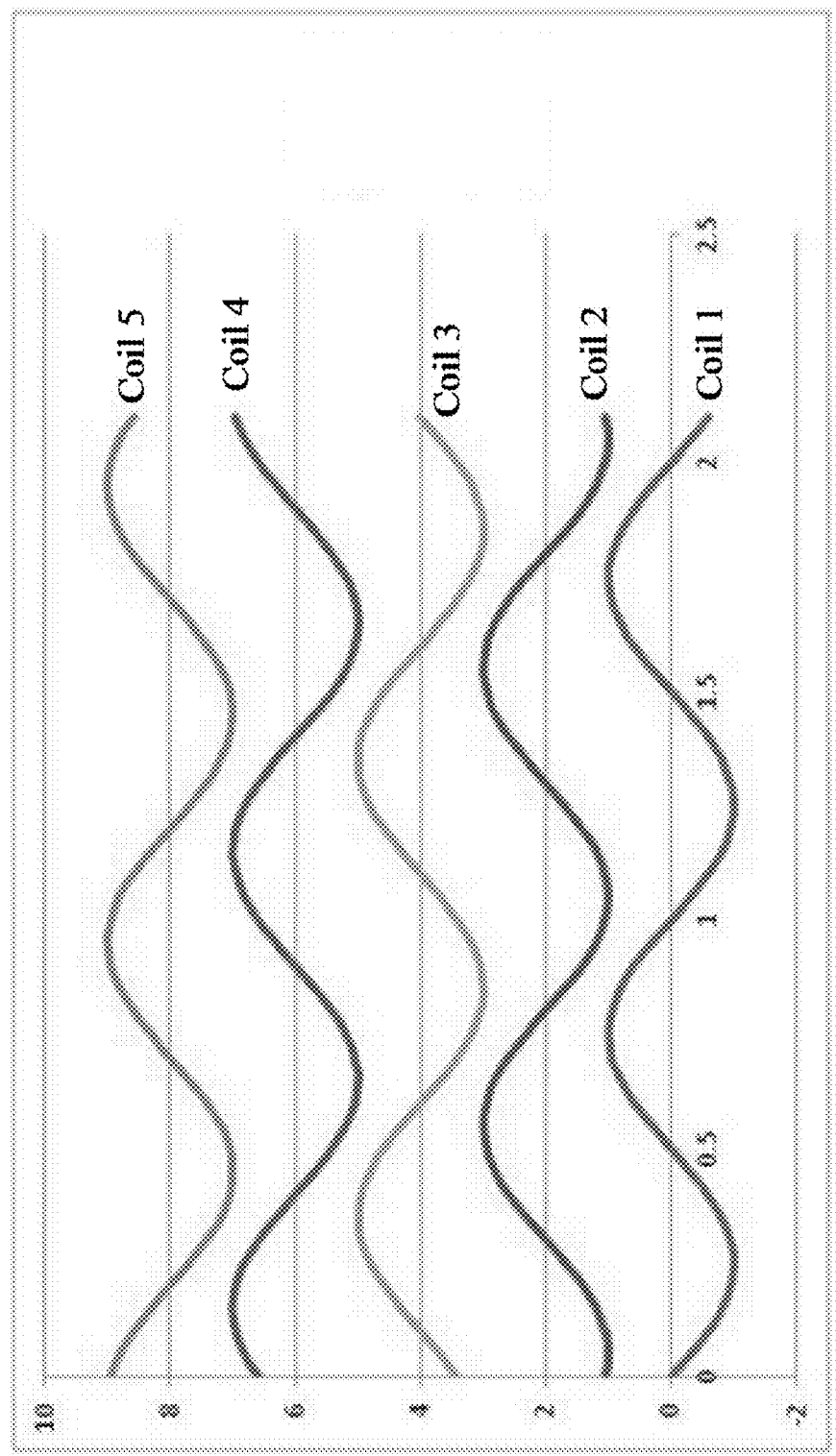
FIG. 2C is a graph of electrical currents which may be used in a writing implement of the type illustrated in FIG. 2B.

The magnetic field generated by the writing implement 220 may depend on the nature of the current supplied to each of the electromagnets. According a non-limiting embodiment, the currents of the electromagnets 222 have a common amplitude, but the current through each is delayed 72 degrees compared to its preceding neighboring electromagnet 222. FIG. 2C illustrates such operation.

FIG. 2C illustrates five exemplary curves representing an example of the five current signals supplied to the respective electromagnetic coils of writing implement 220. The units on the y-axis are arbitrary, as the curves are offset (i.e., are delayed) from each other on the y-axis to facilitate ease of viewing. The units on the x-axis are time. It can be seen that the signals provided to the coils (coil 1-coil 5) are delayed relative to the each other. The amount of offset is selected in this embodiment to provide 360 degrees of total delay for the five electromagnets, and therefore amounts to 72 degrees of delay between neighboring electromagnets.

In the scenario of FIG. 2C, the magnetic field generated by the writing implement 220 of FIG. 2B will be a rotating magnetic field. Considering the writing implement 220 of FIG. 2B in the context of a system like that illustrated in FIG. 1, the magnetic field experienced by the particles of the display 10 will be a rotating magnetic field. There may be some distance between the end of the writing implement and the particles of the display, representing at least the thickness of the front electrode 18, any additional layers of the display 10 between the display medium 13 and the writing implement, and any potential gap between the writing implement and the display (for example if the user does not place the writing implement in direct contact with a surface of the display). A fringe field is the magnetic field generated by a stylus that is outside the area desired to be addressed by the user. Any undesirable fringe fields from a stylus may be minimized by use of a shielding material disposed around the stylus tip. The exact size and shape of shielding materials may be determined by analysis of the magnetic field created by a particular stylus. Such analyses may be carried out via standard Finite Element Modeling software packages (COMSOL MULTIPHYSICS®, FLEXPDE, MOOSE, etc.). The shielding materials may be a high permeability metal (ex. MuMetal®, Magnetic Shield Corporation, Bensenville, Ill.) or a copper shell which would exploit a Lenz law effect to generate eddy currents that negate the fringe magnetic fields from the stylus coils.

Figures 3A, 3B, 3C, 3D, 3E:
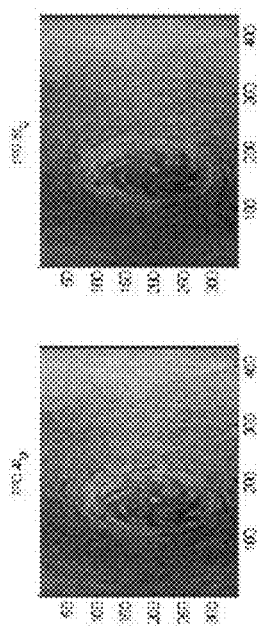
FIGS. 3A-3J represent a sequence of images illustrating magneto-hydrodynamic (MHD) flow of particles created by a rotating magnetic field from a writing implement of the type illustrated in FIG. 2B, according to a non-limiting embodiment.
Figures 3F, 3G, 3H, 3I, 3J:
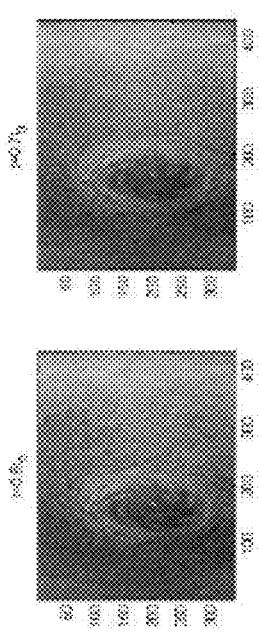

In some embodiments, the rotating magnetic field generated by a writing implement of the types described herein may give rise to a magneto-hydrodynamic (MHD) flow in the display medium 13. FIG. 3A shows a display containing a single absorbing pigment. The display can be addressed electrically to a state where all the pigments are evenly dispersed. Upon application of a rotating magnetic field, the pigments (which also magnetically active) begin to chain and cluster (see FIG. 3B). If the field is kept on for longer times, a toroid shaped rotating pattern in the cluster motion appears in the display (FIGS. 3C-E). This is most likely due to a MHD flow created by the rotating clusters in the confines of the encapsulation chamber. With continued application of the rotating field, the cluster at the center of the flow becomes darker (FIG. 3F-J) and a region around it is depopulated of pigment particles. Using an MHD flow in such a manner we can control the clustering of the pigment particles in the display medium 13. The clusters so formed will have differing levels of efficiency at capturing light entering the display and thus may be used to control the optical transparency of the display medium 13. The MHD flow may result in breaking up any clusters of the pigment particles of the display medium 13, and thus may be used to control the optical transparency of the display medium 13. Clustering darkly colored pigment particles together may allow for greater light to pass through the display medium 13 than if the darkly colored pigment particles were evenly dispersed. Thus, by generating a MHD flow which breaks up particle clusters, and therefore more evenly distributes the particles of the display medium, a desired optical transparency (e.g., opaque) may be achieved. An example is shown in the image sequence of FIGS. 3A-3J.

In those embodiments in which the writing implement used is configured to generate a rotating magnetic field, it is desirable for the particles of the electro-optic display to be of a type which will respond to the rotating magnetic field, for example to give the behavior illustrated in FIGS. 3A-3J. In fact, at least some types of pigment particles which may be used in an electro-optic display may be made to rotate in the presence of a rotating magnetic field. In general, magnetic particles having a magnetic susceptibility between 50-100, a coercivity between 40-120 Oersted (Oe), a saturation magnetization between 20-120 emu/g, and a remanence between 7-20 emu/g are preferred. Additionally, it may be beneficial for the particles to have diameters between 100-1000 nanometers (nm). As a specific, but non-limiting, example, the pigment of an electro-optic display in some embodiments may be a form of magnetite (Iron Oxide, such as Bayferrox 318M), Neodymium oxide (such as Sigma Aldrich 634611 Neodynmium (III) Oxide), Iron and Copper Oxide (such as Sigma Aldrich Copper Ferrite), or an alloy of Iron and Cobalt or Iron and Nickel (such as Sigma Aldrich Iron-Nickel Alloy Powder and American Elements Iron-Cobalt Alloy Nanopowder).

The strength of the magnetic field produced by the writing implement may also be at a level selected to provide beneficial operation of electro-optic display. For example, the magnetic field produced by the writing implement may be at least 1 milliTesla (mT). In practice, generating magnetic fields in excess of 1 T inside the ink may be technically and economically prohibitive in some scenarios. Thus, in some embodiments the magnetic field applied may be between 1 mT and 1 T.

In addition to phase, other characteristics of the signals used to drive the coils of a writing implement may be controlled to provide desired operation. For example, considering again the writing implement 200 of FIG. 2A, the greater the amplitude of the drive signal, the faster the display medium 13 reacts to the drive. Thus, if a quick switching response of the display medium 13 is desired, use of a higher drive voltage is appropriate. For a given drive amplitude, the frequency of the drive signal may be varied to provide a desired response time. The Applicant has appreciated that increasing frequency results in increased switching speed of the display only up to a point, after which increasing the frequency of the drive signal results in decreased switching speed of the display. As a non-limiting example, Applicant found that a drive signal frequency of approximately 25 Hz resulted in the fastest switching speeds for a particular display. However, it should be appreciated that the exact frequency resulting in the most rapid switching of the display state may depend on parameters such as the magnetic field strength, as well as properties of the display. Moreover, if alternating current (AC) pulses are used to drive the coil(s) of the writing implement, the pulse width may impact the response of the display medium.

Many combinations of factors, including drive frequency, drive amplitude, and pulse width of the driving signal of the writing implement, may be adjusted to provide desired behavior for a particular application.

The writing implement described herein may be configured to be handheld in some embodiments. For example, as shown in FIG. 2B, the writing implement may include an elongate tubular member configured to be handled by a user. The tubular member may be suitably sized to hold the electromagnets while still being of a size that can fit into a user's hand. For example, the tubular member may have a diameter of less than 5 cm, less than 4 cm, less than 3 cm, or any other suitable diameter, and may have a length of less than 10 cm, less than 8 cm, less than 5 cm, between 3 and 10 cm, or any other suitable length. The weight of the writing implement may not be so great as to make manipulation of the writing implement difficult.

Aspects of the present application relate to magnetic print heads. Although FIGS. 1, 2A, and 2B focus on the provision of a writing implement which may be handheld, it should be appreciated that the same manner of operation may be utilized in the form of a magnetic print head disposed above or below the display medium 13. An example is illustrated in FIG. 4A.

As shown, a device 400 includes a magnetic print head 402 disposed adjacent an electro-optic display. In this example, the magnetic print head 402 is beneath the electro-optic display, but alternative configurations are possible, such as having the magnetic print head 402 be disposed above the electro-optic display. The magnetic print head includes a magnetic core 404, such as a ferrite core or Nickel-Iron alloy core, and a coil (or winding) 406. The magnetic core is configured such that the magnetic field 408 generated by the magnetic print head has fringes entering the display medium 412 of the electro-optic display. This is evidenced by the illustrated magnetic field lines representing the magnetic field 408.

The electro-optic display includes a first electrode 410 proximate the magnetic print head 402, the display medium 412 having white pigment particles 414 and black pigment particles 416, a dielectric layer 418, and a second electrode 420, distal the magnetic print head. For ease of illustration, the white pigment particles 414 and black pigment particles 416 are illustrated in FIG. 4A as particle clusters, rather than individual particles. FIG. 4B, described below, illustrates the particles individually.

Figure 4A:
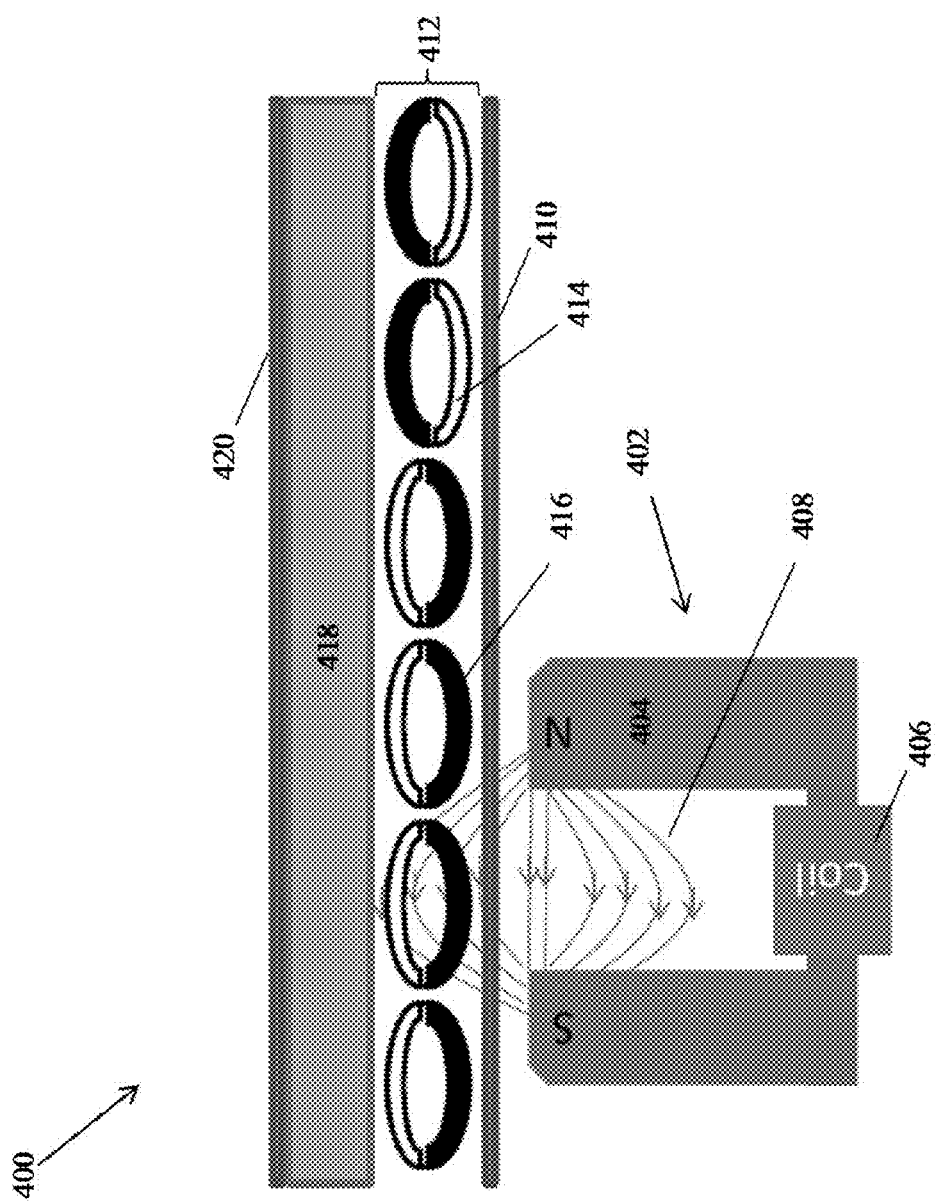
FIG. 4A illustrates a magnetic print head in connection with an electro-optic display, according to a non-limiting embodiment of the present application.
Figure 4B:
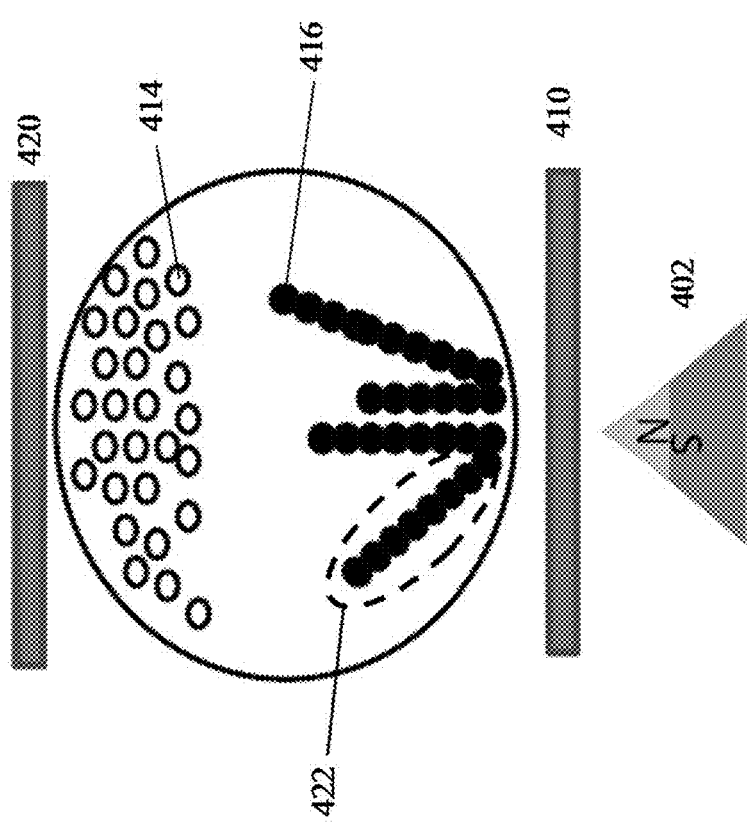
FIG. 4B illustrates a detailed representation of the operation of the magnetic print head of FIG. 4A.

In the example of FIG. 4A, the black pigment particles 416 are presumed to be magnetically responsive, in addition to being electrically responsive. Thus, by applying a magnetic field in the manner illustrated using the magnetic print head 402, the black pigment particles 416 may be pulled toward the magnetic print head 402, and therefore be disposed between the white pigment particles 414 and the first electrode 410. This is to be contrasted with the region of the electro-optic display not subject to the magnetic field of the magnetic print head 402, where it can be seen that the white pigment particles 414 are disposed between the black pigment particles 416 and the first electrode 410. A user viewing the electro-optic display from the side of the second electrode 420 will therefore see white in the regions impacted by the magnetic field 408 of the magnetic print head 402, and will see black elsewhere. Thus, it should be appreciated that the device 400 provides the ability to locally write on the electro-optic display. Moreover, the first and second electrodes 410 and 420 provide the ability to globally address the electro-optic display, meaning that the device 400 may be both globally and locally addressed.

The magnetic print head 402 may be moved relative to the electro-optic display in any suitable manner, for example using mechanical and/or electrical drive structures to translate the print head. Also, while FIG. 4A illustrates a single magnetic print head 402, the aspects of the present application relating to use of a magnetic print head are not limited to having only a single magnetic print head. Rather, any suitable number of magnetic print heads may be provided. The number selected may depend at least partially on the size of the display, for example with more magnetic print heads being used for larger displays.

FIG. 4B provides a more detailed view of certain components of the device 400. In this figure, the white pigment particles 414 and black pigment particles 416 are illustrated individually. The magnetic print head 402 is illustrated in simplified form to reflect how the relative positioning of the magnetic poles give rise to a gradient magnetic field. As shown, the black pigment particles 416 are attracted by the magnetic field of the magnetic print head 402 and therefore are pulled near the magnetic print head. In the illustrated example, the black pigment particles 416 form particle chains, such as particle chain 422. Rotating the magnetic field generated by the magnetic print head 402, for example, in the manner previously described herein for writing implements, may break the chains apart. Thus, the optical state of the electro-optic display may be controlled by controlling the magnetic field of the magnetic print head 402.

Figure 5:
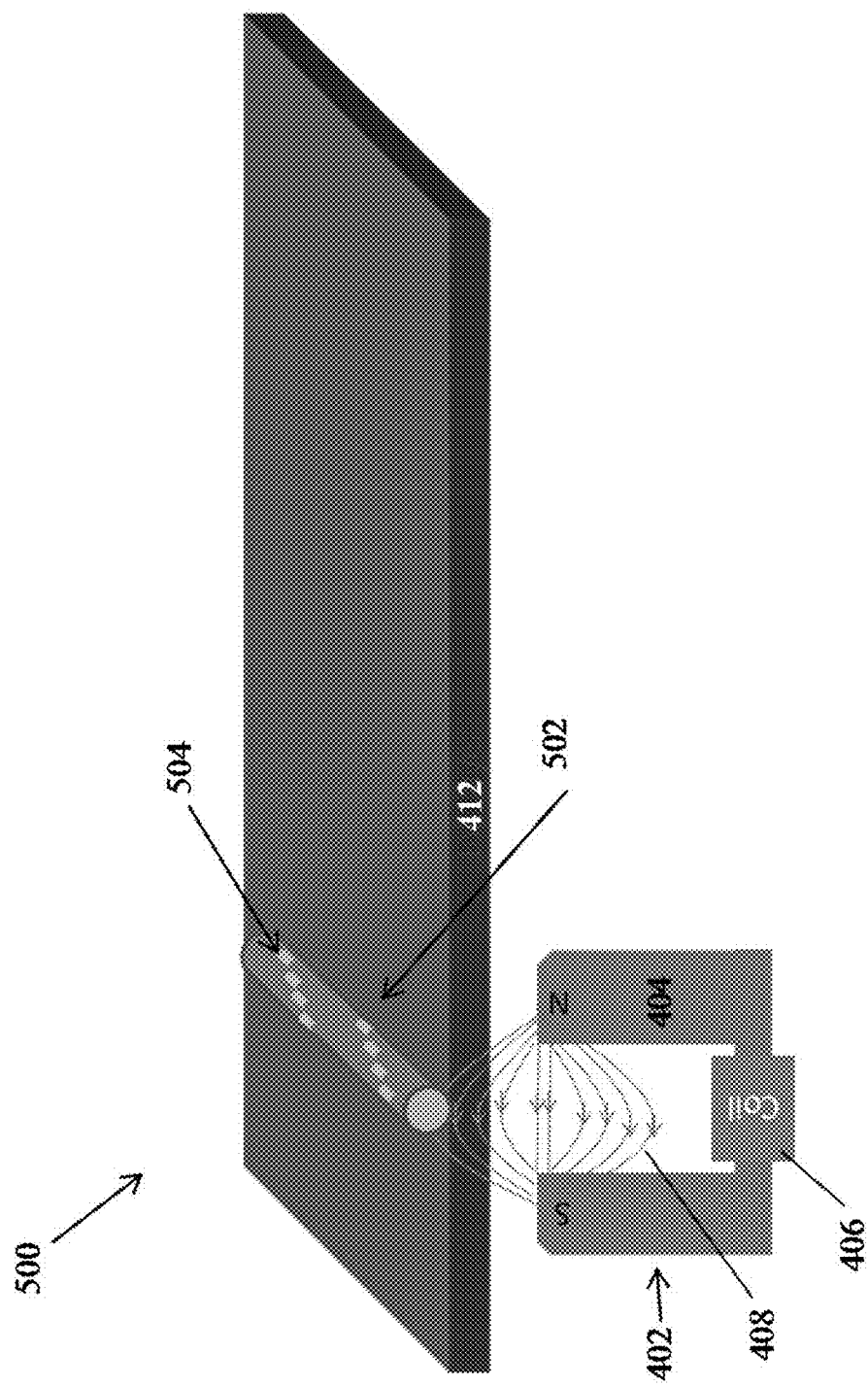
FIG. 5 illustrates a system in which a magnetic print head and a conductive rod operate in combination to locally address an electro-optic display, according to a non-limiting embodiment of the present application.

A magnetic print head may also be used in combination with a roller to provide high speed, high resolution printing. In general, the nature of any material disposed on an opposite side of the electro-optic display from the magnetic print head 402 (or a writing implement in alternative embodiments) may impact the local addressing of the magnetic print head. For example, a permeable material, such as steel, will experience an induced magnetic field aligned with the magnetic field of the magnetic print head 402, or the stylus in embodiments in which a stylus is used. The induced magnetic field will reduce the gradient experienced by the display medium. By contrast, placing a highly conductive material in the changing magnetic field that may result from a nearby magnetic print head (or a stylus, when a stylus is used) will diminish the magnetic field experienced by the display medium, and may increase the magnetic field gradient. The Applicant has appreciated that combining a highly conductive material and a highly permeable material gives the ability to achieve high resolution addressing. FIG. 5 illustrates an example.

The device 500 of FIG. 5 includes a rod 502 (or roller) positioned such that the display medium 412 is between the rod 502 and the magnetic print head 402. The rod may be formed substantially of a highly conductive material, such as copper, and may include portions 504 formed of a highly permeable material, such as steel. In the illustrated example, the portions 504 may correspond to pixels of the electro-optic display, and may be positioned such that the rod 502 completes a revolution for each row of pixels. The portions 504 may be suitably shaped to correspond to pixels, for example being squares. By turning the magnetic field of the magnetic print head 402 ON and OFF at suitable times, the pixels corresponding to the portions 504 may be suitably addressed. The resolution of the addressing may therefore be controlled by the sizing of the portions 504, allowing for high resolution local addressing.

Figure 6:
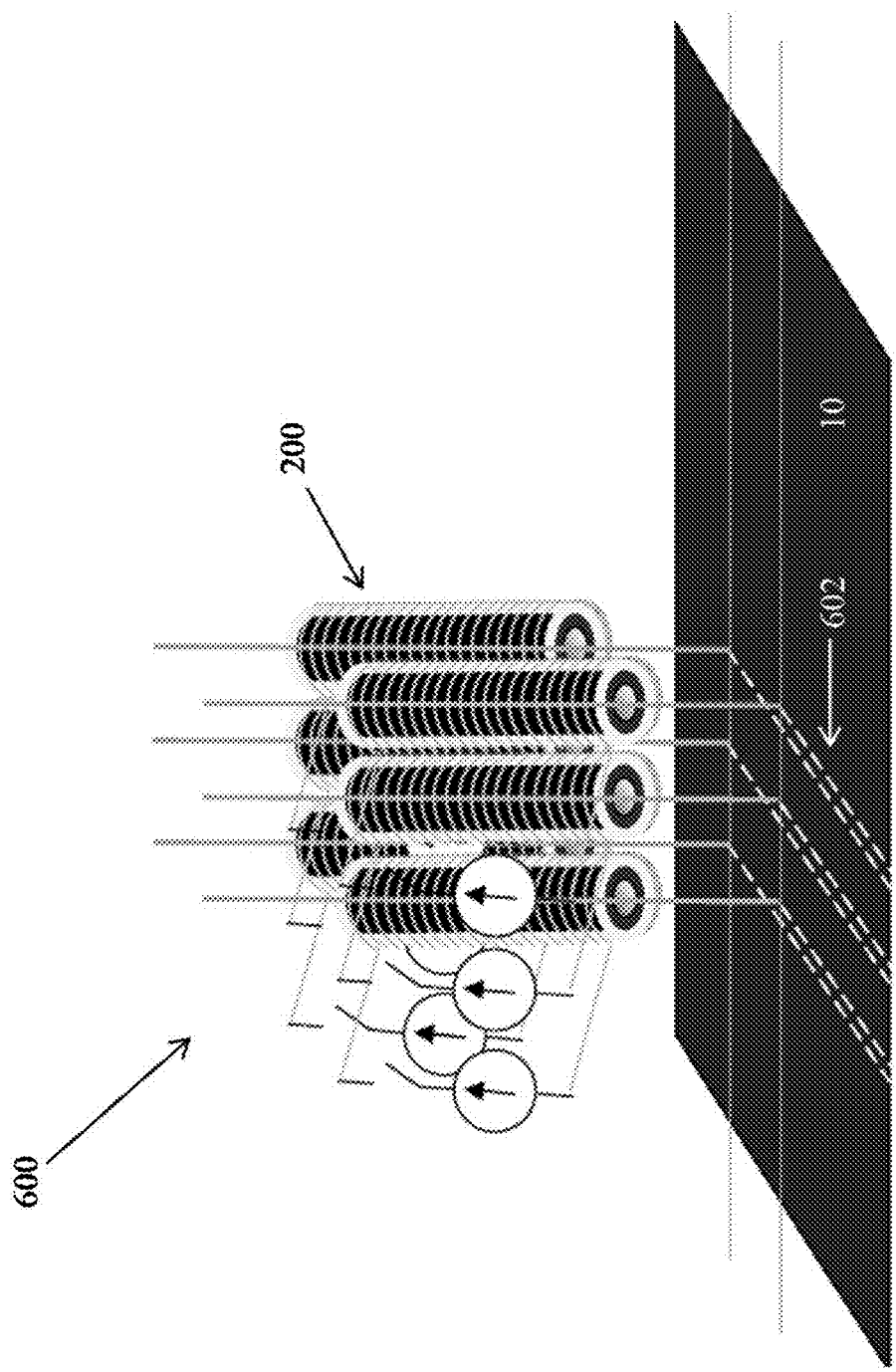
FIG. 6 illustrates a collection of electromagnetic write implements which may be used to construct a magnetic print head array, according to a non-limiting embodiment of the present application.

The magnetic print heads described herein may include one or more electromagnets, for example of the type illustrated in FIG. 4A or FIG. 2A. The print head could have a line or matrix of electromagnets. In such embodiments, one or more, and in some cases each, of the electromagnets may have a focusing element, such as a focusing pin, which moves along the display medium. It may be beneficial to stagger the electromagnets to avoid physical interference. FIG. 6 illustrates a non-limiting example.

Device 600 includes a collection of six writing implements 200 of the type previously described in connection with FIG. 2A. The six writing implements 200 are positioned to avoid physical interference. Namely, they are staggered. As shown, the positioning allows the writing implements 200 to create a pattern of lines 602 on the display 10. Thus, it can be seen how suitable placement of the writing implements may form the basis of a magnetic print head.

Figure 7:
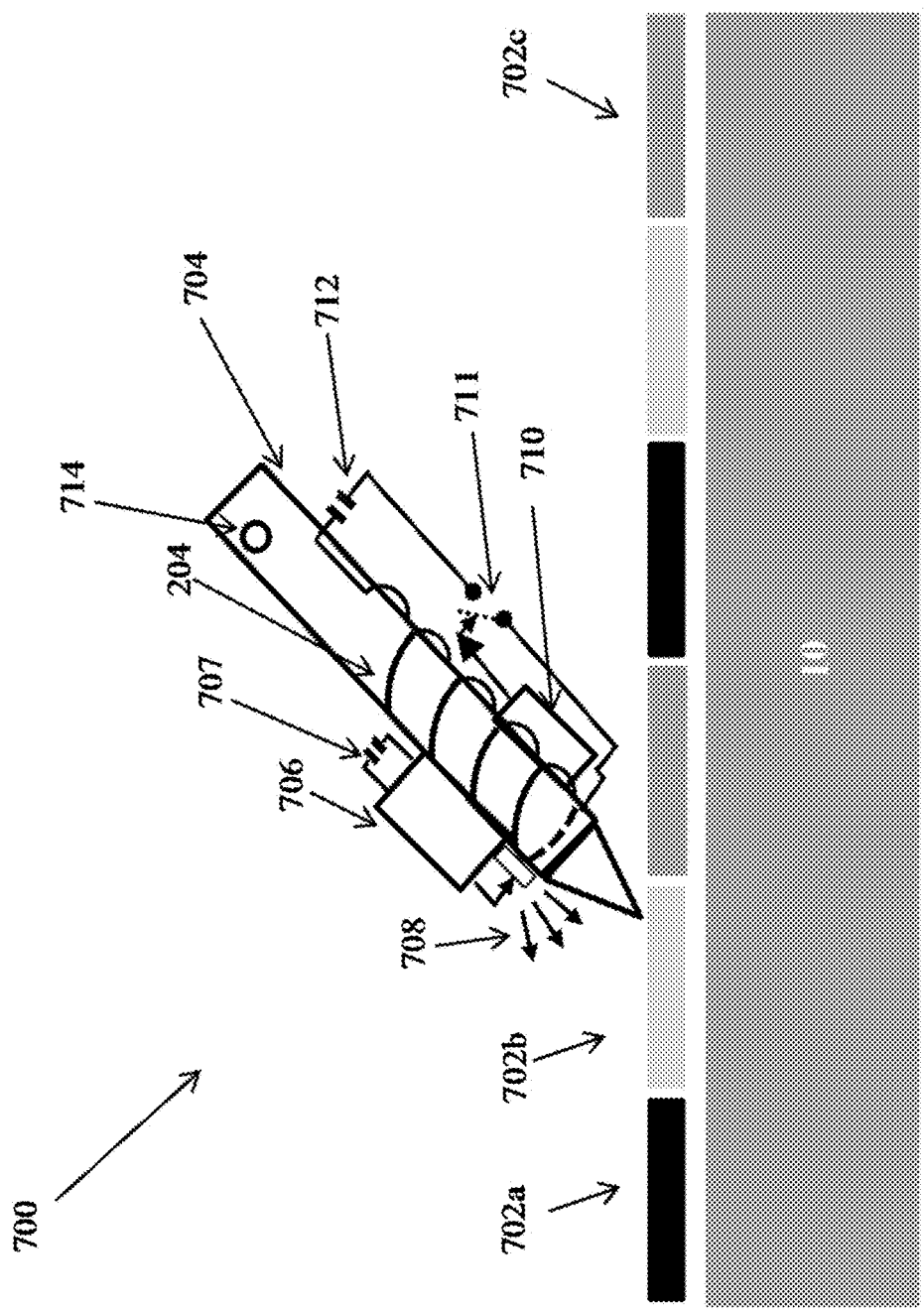
FIG. 7 illustrates a writing implement configured to locally address an electro-optic display over selected color portions, according to a non-limiting embodiment of the present application.

According to an aspect of the present, an electro-optic display and a writing implement operate in combination to provide global and local addressing of the display, with the local addressing including the capability to write in different colors. According to one such embodiment, the electro-optic display may include color filters distributed over a display surface of the display. The writing implement may detect when it is over filters of a desired color, and locally address the display only in such instances. An example is described in connection with FIG. 7.

The system 700 includes the electro-optic display 10 and a writing implement 704. The electro-optic display 10 in this embodiment includes color filters 702a, 702b, and 702c of three different colors. Other numbers of colors (e.g., two or more color filter types) may be provided. The color filters 702a-702c may be sized and positioned to correspond to a desired color pixel pattern of the electro-optic display 10. For example, a Bayer pattern may be implemented, with red, green, and blue color filters.

The writing implement 704 may be similar to the writing implement 200 of FIG. 2A or 220 of FIG. 2B, but may additionally include a light source 706 generating light 708, and having a power source 707. The light source 706 may be a light emitting diode (LED) or other suitable light source. Additionally, the writing implement 704 includes photodetector 710, which can be a photodiode or other suitable type of photodetector. The photodetector 710 is coupled to a switching circuit 711 and power source 712.

In operation, the light source 706 produces light 708. The light 708 reflects from the color filters 702a-702c and is detected by the photodetector 710. If the light detected is of a particular color, the coil 204 may be activated to provide local addressing by the writing implement 704. In this manner, the writing implement 704 may be used to address the electro-optic display locally only over pixels of a desired color, thus effectively allowing for local addressing in that color.

As a specific example, it may be assumed that the color filters 702a are green filters, the color filters 702b are blue filters, and the color filters 702c are red filters. A user may desire to write in the color green with the electro-optic display. The user may select the color (e.g., green) via a selection button 714 on the writing implement. The selection button 714 may alternatively be a switch, slider, or other suitable selection mechanism, and one may be provided for each color that can be selected, or a shared button may be used.

As the writing implement 704 is moved over the display 10 by the user, the switch 711 will be closed when the photodetector 706 detects green light, meaning that the writing implement is in proximity to a portion of the display 10 covered by a green color filter 702a. The coil 204 will be activated accordingly, and thus the writing implement will locally address the region of the display 10 covered by the color filter 702a. When the writing implement 704 is positioned adjacent the regions of the display 10 covered by color filters 702b and 702c, the switch 711 will be opened and the coil 204 de-activated. Thus, the writing implement will not address those regions of the display 10. In this manner, the writing implement may be used to effectively address the display 10 locally in various colors.

As has been described previously herein, embodiments of the present application utilize an electro-optic layer having particles that are electrically responsive and magnetically responsive. Control over the display state of an electro-optic display including such an ink may be provided by suitable combination of electric and magnetic fields. The electric fields may be provided, as previously described, by electrodes between which the electro-optic layer is sandwiched. The magnetic field may be supplied by a writing implement or magnetic print head, as examples. Described now are various types of control which may be realized by combination of electric and magnetic driving.

Table 1 illustrates different schemes for operating an electro-optic display having a single pigment that is both electrically and magnetically responsive. In the table, "EM" stands for "electromagnet" and "PM" for "permanent magnet."

TABLE 1

Different schemes for operating an electro-optic display having a single pigment that is both electrically and magnetically responsive.

| Function | Single Pigment Ink White writing on Black | Single Pigment Ink Black writing on White |
| --- | --- | --- |
| Global Address | High Voltage DC pulse or High Voltage AC shutter close waveform | High Voltage AC shutter open waveform. |
| Local Write | Permanent Magnet (PM/EM)/Electromagnet | Rotating field stylus(PM/EM) |
| Local Erase | Rotating field stylus(PM/EM) | Permanent Magnet (PM/EM)/Electromagnet |
| Front Light | Yes | Yes |

As described previously, for example in connection with FIG. 1, the ink may be encapsulated and coated between transparent electrodes. The single pigment ink may be addressed electrically via shutter mode operation. That is, "shutter close" (in which the ink is made substantially opaque) and "shutter open" (in which the ink is made substantially transparent) operations may be performed using corresponding pulses or waveforms. For example, a high voltage direct current (DC) pulse (SHUTTER CLOSE) may be used to pull the pigment to the front or back of the display to create the shutter close state. Alternatively, a high voltage alternating current (AC) pulse of intermediate frequency may be used, which may cause higher order electroosmotic flows in the compartment, such that the pigment is evenly dispersed.

A high voltage, high frequency AC pulse may cause the pigment to shutter into clumps, and therefore may be used to create the shutter open state. This electrically driven shuttering causes the entire device to become transparent to light. If a reflective layer is placed on one side of the ink, then the shuttered ink looks like it is in its white state. The reflector layer may be lambertian, specular or wavelength dependent and it may be illuminated either via a backlight or via a front light layer.

For local addressing, a suitable stylus may be used, such as one of the writing implements described herein (see, e.g., FIGS. 2A and 2B). In some embodiments, the stylus may include a permanent magnet. The permanent magnet may be used to generate a static magnetic field, or may be mounted appropriately to cause it to oscillate or rotate to generate an oscillating or rotating magnetic field.

A specific example is now described in connection with Table 1 (Table 1, left column). In this example, the electro-optic display includes a single (black) pigment disposed adjacent a white reflector. To write and erase on a dark state, a SHUTTER CLOSE pulse is applied to switch the entire display to its dark state. Then, to write locally, a spatially fixed dipole stylus is applied to the area we seek to address. The magnetic field will cause the pigments to chain and shutter. This will allow the user to see the white layer below the ink and write a local white state. By controlling the magnitude of the field or time for which it is applied to the ink, we can partially shutter the ink in the display and write a gray state.

To perform a local erase, a spatially rotating dipole stylus comprised of a rotating permanent magnet or an electromagnetic coil array where each coil is driven with a purposefully chosen phase relationship with its nearest neighbors may be used. A stylus of this kind produces a rotating magnetic field and gradient which in turn creates a flow inside the encapsulated ink. The effect of this flow is to break up all chained pigment clumps and redistribute the pigment in the encapsulated phase. This state is optically dark.

To globally erase (or write) the display, a SHUTTER CLOSE pulse may be applied to switch the entire display to its dark state.

As another example, text may be written or erased on an open (white) state (Table 1, right column).

A SHUTTER OPEN pulse may be applied to switch the entire display to its white state. Local writing may be achieved using a spatially rotating dipole stylus comprised of a rotating permanent magnet or an electromagnetic coil array where each coil is driven with a purposefully chosen phase relationship with its nearest neighbors (e.g., writing implement 220). This state is optically dark. By controlling the magnitude of the field or time for which it is applied to the ink, we can partially shutter the ink in the display and write a gray state.

To locally erase, a spatially fixed dipole stylus generating a constant magnetic field may be applied to the area we seek to address. The magnetic field will cause the pigments to chain and shutter. This will allow the user to see the white layer below the ink and write a local white state.

To globally erase or write, a SHUTTER OPEN pulse may be applied to switch the entire display to its white state. Writing resolution can be improved by shielding the ink from any undesirable effects of fringe B-fields from the magnetic stylus. Ways of reducing the effects of the fringe field for a permanent magnet or a DC electromagnet based stylus include using a high permeability magnetic material (e.g., MUMETAL®) for shielding.

Table 2 illustrates scenarios of operating an electro-optic display having multiple pigments, at least one of which is both electrically and magnetically responsive. The other pigment may be electrically responsive. Also, in these scenarios it is assumed the electro-optic display includes an active matrix layer as an electrode, with the other electrode being transparent.

TABLE 2

Scenarios of operating an electro-optic display having multiple pigments, at least one of which is both electrically and magnetically responsive.

| Function | Multi Pigment Ink + Active Matrix Layer Gray writing on Black | Multi Pigment Ink + Active Matrix Layer Gray writing on White |
|---|---|---|
| Global Address | High Voltage DC pulse | High Voltage DC pulse |
| Local Write | Permanent Magnet (PM/EM)/Electromagnet | Rotating field stylus(PM/EM) |
| Local Erase | Active-matrix-based erase | Active-matrix-based erase |

The multiple pigment ink may be addressed electrically via a RAIL STATE pulse which may be a high voltage DC pulse which pulls the reflective pigment to the front (or back) of the display. Thus, the entire device may be in the optically reflective (or colored) state. A front light may be used with this display to enable operation in low light conditions.

We use a stylus containing a single or an array of permanent magnet(s) or electromagnet(s). The position(s) (relative to the ink) of the permanent magnet(s) can be controlled electrically. The electrical current in the electromagnet(s) can be controlled electrically. A series of specifically chosen voltage pulses (stylus waveform) can be devised to produce desired levels of optical change in the ink. The assembly of permanent magnets and coils may be shielded using high permeability or high conductivity materials to achieve the desired levels of resolution. A color filter array and fiducial system as described above may be used in conjunction with the proposed display to enable color writing.

Now described is the operation of the device for writing and erasing text on a dark state (Table 2, left column). A high voltage rail pulse may be applied to switch the entire display to its dark state. To locally write to the ink, a spatially fixed dipole stylus may be applied to the area we seek to address. The magnetic field will cause the pigments to chain and shutter. This will allow the user to see the white pigment layer below the ink and write a local gray state. By controlling the magnitude of the field or time for which it is applied to the ink, we can partially shutter the ink in the display and write a different gray state. A time-varying magnetic field is able to produce a bi-stable state.

To locally erase the state written above, the active matrix scheme may be used to electrically drive the display locally to its dark state. To globally erase any information written with the stylus on this display, a high voltage rail pulse may be applied to switch the entire display to its dark state.

Now described is an example of writing and erasing text on a white state (Table 2, right column).

A high voltage rail pulse may be applied to switch the entire display to its white state. To locally write, a spatially rotating dipole stylus comprised of a rotating permanent magnet or an electromagnetic coil array where each coil is driven with a purposefully chosen phase relationship with its nearest neighbors may be used. By controlling the magnitude of the field or time for which it is applied to the ink, we can partially shutter the ink in the display and write various gray states.

To locally erase the state written above, the active matrix scheme may be used to electrically drive the display locally to its white state. To globally erase any information written with the stylus on this display, a high voltage rail pulse may be applied to switch the entire display to its white state.

Table 3 illustrates further scenarios of operation of an electro-optic display in accordance with embodiments of the present application. In these scenarios, it is assumed the electro-optic display includes a single pigment and has an active matrix addressing. In these scenarios, the electro-optic device may include a front light.

TABLE 3

Scenarios of operation of an electro-optic display having a single pigment and using active-matrix addressing.

| Function | Single Pigment Ink + active matrix addressing Layer White writing on Black | Single Pigment Ink + active matrix addressing Layer Black writing on White |
|---|---|---|
| Global Address | High Voltage DC pulse or High Voltage AC shutter-close waveform | High Voltage AC shutter-open waveform. |
| Local Write | Permanent Magnet (PM/EM)/Electromagnet | Rotating field stylus(PM/EM) |
| Local Erase | Active matrix addressing based erase | Active matrix addressing based erase |
| Front Light | Yes | Yes |

As described previously, a desired level of addressing can be controlled by varying the applied magnetic field or gradient (from a writing implement or magnetic print head) as well as concurrently applied electrical field. This can be done on a static or time-varying basis. In some instances the time variance in the electric and magnetic fields will be synchronized, however, it may be useful to have such synchronization out of phase, for example to accommodate drag between the pigments and the internal phase. Such a matching could be achieved by controlling magnetic stylus geometry and/or magnetic field while changing the voltage on the front electrode.

To illustrate some such embodiments, it is assumed that the electro-optic display has a magnetic black pigment and a non-magnetic white pigment in an encapsulated dispersion. The magnetic pigment is also electrically responsive and the display can be driven to a white or dark state with a high voltage electrical pulse.

Figure 8A:
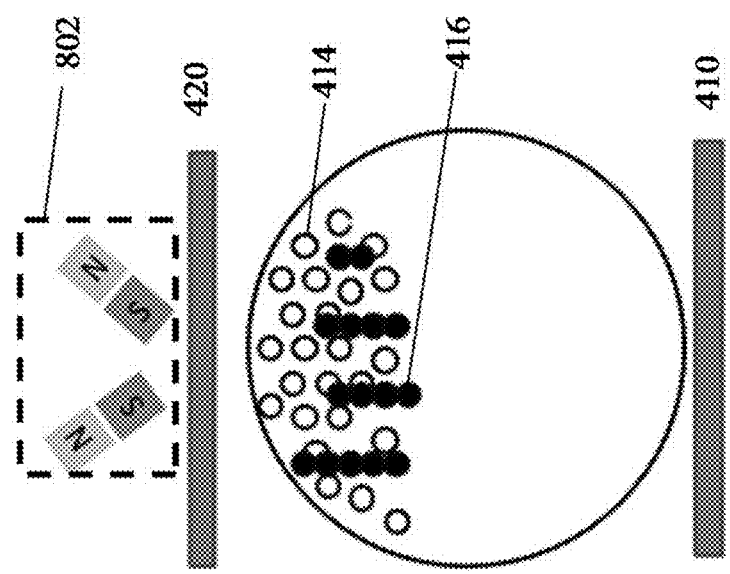

As shown in FIG. 8A, in this case in which the display is addressed globally with a voltage pulse and set to the white state, local addressing may be achieved with a stylus 802 comprising small rotating pole electromagnet coil array (e.g., the writing implement of FIG. 2B). In FIGS. 8A and 8B, 802 represents stylus 220 from FIG. 2B with all coils driven with different DC electrical drive, or a configuration of permanent magnet/s producing an identical magnetic field pattern at the location of the particles. If the magnetic field is applied, the optical state of the ink changes, resulting in a region under the coil, which is addressed, to change to a graytone. This happens because the magnetic black pigment 416 chains and some of those chains are pulled into the white pack, as shown in FIGS. 8A and 8B.

At constant frequency, varying the amplitude produces a monotonic shift in the rate at which the optical state changes. For example, increasing the applied current (i.e. increasing the field produced by the coil) causes the speed of switching to increase.

In at least some scenarios, the rotating magnetic field from a writing implement (such as writing implement 220 of FIG. 2B) is superior at producing optical changes when compared with a single coil stylus with an AC current (e.g., writing implement 200 of FIG. 2A). As shown in FIGS. 9A and 9B, the display can be reset using a voltage pulse that shakes up all the pigments in the display and ultimately drives it to the dark state. (This shows up the black bar-like structure in the plots.) Once in the dark state, a magnetic field is applied at varying levels of strength using either a rotating field stylus (FIG. 9A) or a simple electromagnet stylus (FIG. 9B). Upon application of the magnetic field, the optical state of the display becomes lighter (increased L*). In FIG. 9A, a rotating magnetic field is applied via a 5 pole stylus with increased strength after each reset. As seen in the FIG. 9A, the display can be driven almost all the way to the white rail state of the display. In FIG. 9B the measurement described above is repeated but a single coil is used to generate a simple AC magnetic field that is applied after every reset. For both FIGS. 9A and 9B., the amount of current in the coil is increasing with time, while the electric fields are being switched on an off quickly and then left at 0V. As can be seen by comparing FIG. 9A to FIG. 9B, the same amount of current results in a transition to a lighter white state in a 5 pole rotating stylus than a simple single coil stylus. The enhanced performance of the rotating magnetic field (FIG. 9A) may be due to the vortex-like nature of the flow field induced in the encapsulated ink by the rotating magnetic field, which helps the pigment to more quickly travel through the internal phase.

Thus, it should be appreciated from the foregoing discussion that utilizing an appropriate combination of magnetic and electric driving of an electro-optic display may allow for better contrast ratio and rail state behavior than if only one type of driving was implemented.

As previously described, in some embodiments an electro-optic display for use in conjunction with a writing implement (or print head) may provide active matrix assist of local addressing by the writing implement. The electro-optic display may include an active matrix backplane, allowing for electric driving of the electro-optic display on a pixel-by-pixel basis. The writing implement may be used by a user to locally address the electro-optic display in any of the manners described previously herein. As described, in some embodiments, local addressing with a writing implement (or print head) may result in a gray state rather than a desired rail state (white or black). In some embodiments, the electro-optic display may track the location of the writing implement, thus determining which pixels of the electro-optic display have been addressed by the writing implement. The electro-optic display may then electrically drive to the rail state those pixels addressed by the writing implement using the control afforded by the active matrix. In this manner, the local addressing of the writing implement may be enhanced.

Aspects of the present application may provide one or more of the following benefits. It should be appreciated that not all aspects necessarily provide each of the following benefits, and that benefits other than those listed may be provided. Some aspects of the present application provide for displays with global and local addressing capabilities. The displays may be globally addressed to perform an erase function, and may be locally addressed with a handheld writing implement or a magnetic write head. Certain embodiments provide for local addressing in various colors. The displays described herein may be fabricated in any suitable size, and in at least some embodiments may be large scale displays, for example greater than 30 inches in diagonal.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. For example, those of ordinary skill in the art will readily envision a variety of other means and/or structures for performing the function and/or obtaining the results and/or one or more of the advantages described herein, and each of such variations and/or modifications is deemed to be within the scope of the embodiments described herein. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, kits, and/or methods described herein, if such features, systems, articles, materials, kits, and/or methods are not mutually inconsistent, is included within the scope of the present disclosure.

The invention claimed is:

1. An apparatus for addressing an electro-optic display, comprising:
    an elongate tubular member having a first end and a second end, the elongate tubular member being sized to be hand-held, and being configured to allow a user to address an electro-optic display; and
    an electromagnet comprising five magnetic cores with wire coils disposed around each magnetic core, wherein each wire coil receives a time-varying electric signal, and the electromagnet is configured to generate, from the first end of the elongate tubular member, a rotating magnetic field.

2. The apparatus of claim 1, wherein the five magnetic cores are configured to substantially define a closed contour.

3. The apparatus of claim 1, wherein the rotating magnetic field is generated using a combination of electrical signals having different phase shifts.

4. The apparatus of claim 1, wherein the elongate tubular member has a diameter less than approximately 3 cm.

5. The apparatus of claim 1, further comprising a shielding material positioned proximate to the first end of the elongate tubular member.

6. The apparatus of claim 5, wherein the shielding material is a high permeability metal or copper.

7. A system, comprising:
    the apparatus of claim 1; and
    an electro-optic display containing electro-optic particles configured to change visible state in response to application of a rotating magnetic field.

8. The system of claim 7, wherein the electro-optic display is an electrophoretic display containing electrophoretic particles.

9. The system of claim 8, wherein the electro-optic display comprises a first transparent electrode.

10. The system of claim 9, wherein the electro-optic display further comprises a second transparent electrode, a first opaque electrode, or an active matrix of transistors.

11. An apparatus for addressing an electro-optic display, comprising:
    an elongate tubular member having a first end and a second end, being sized to be hand-held, and being configured to allow a user to address an electro-optic display; and
    an electromagnet comprising three magnetic cores with a wire coil disposed around each of the three magnetic cores wherein each wire coil receives a time-varying electric signal, and the electromagnet is configured to generate, from the first end of the elongate tubular member, a rotating magnetic field.

12. The apparatus of claim 11, wherein the three magnetic cores are configured to substantially define a closed contour.

13. The apparatus of claim 11, wherein the rotating magnetic field is generated using a combination of electrical signals having different phase shifts.

14. The apparatus of claim 11, wherein the elongate tubular member has a diameter less than approximately 3 cm.

15. The apparatus of claim 11, further comprising a shielding material positioned proximate to the first end of the elongate tubular member.

16. The apparatus of claim 15, wherein the shielding material is a high permeability metal or copper.

17. A system, comprising:
    the apparatus of claim 11; and
    an electro-optic display containing electro-optic particles configured to change visible state in response to application of a rotating magnetic field.

18. The system of claim 17, wherein the electro-optic display is an electrophoretic display containing electrophoretic particles.

19. The system of claim 18, wherein the electro-optic display comprises a first transparent electrode.

20. The system of claim 19, wherein the electro-optic display further comprises a second transparent electrode, a first opaque electrode, or an active matrix of transistors.

* * * * *